United States Patent

Burkhardt et al.

[11] 3,922,024
[45] Nov. 25, 1975

[54] BOGIE SUSPENSION SYSTEM

[75] Inventors: David J. Burkhardt, Brookfield, Wis.; Clair D. Splittstoesser, Roseau, Minn.

[73] Assignee: Outboard Marine Corporation, Waukegan, Ill.

[22] Filed: Dec. 26, 1973

[21] Appl. No.: 427,544

[52] U.S. Cl. ............................... 305/27; 180/5 R
[51] Int. Cl.² .................................. B62D 55/16
[58] Field of Search ............... 305/27, 28, 31, 32; 301/133; 180/5 R, 9.26, 9.28, 9.3, 9.34, 9.36; 403/340, 335

[56] References Cited
UNITED STATES PATENTS

| | | | |
|---|---|---|---|
| 2,007,897 | 7/1935 | Skeel | 403/335 |
| 3,023,824 | 3/1962 | Bombardier | 305/23 |
| 3,533,662 | 10/1970 | Richards | 305/27 |
| 3,684,043 | 8/1972 | Hirsch | 180/5 R |
| 3,744,583 | 7/1973 | Bedard | 180/5 R |
| 3,788,412 | 1/1974 | Vincent | 180/5 R |

Primary Examiner—Philip Goodman
Assistant Examiner—John A. Carroll
Attorney, Agent, or Firm—Michael, Best & Friedrich

[57] ABSTRACT

Disclosed herein is a truck suspension comprising a first bogie wheel supporting truck including a first sleeve, a second bogie wheel supporting truck including a second sleeve, means pivotally mounting the first and second trucks on a frame for rotation about a common axis, first and second stop members respectively extending axially and oppositely from the first and second sleeves and engagable with each other for preventing pivotal movement of the trucks toward each other beyond a predetermined angle, and means biasing the first and second trucks for pivotal movement toward each other and for engaging the stop members with a predetermined force.

9 Claims, 5 Drawing Figures

U.S. Patent  Nov. 25, 1975  3,922,024
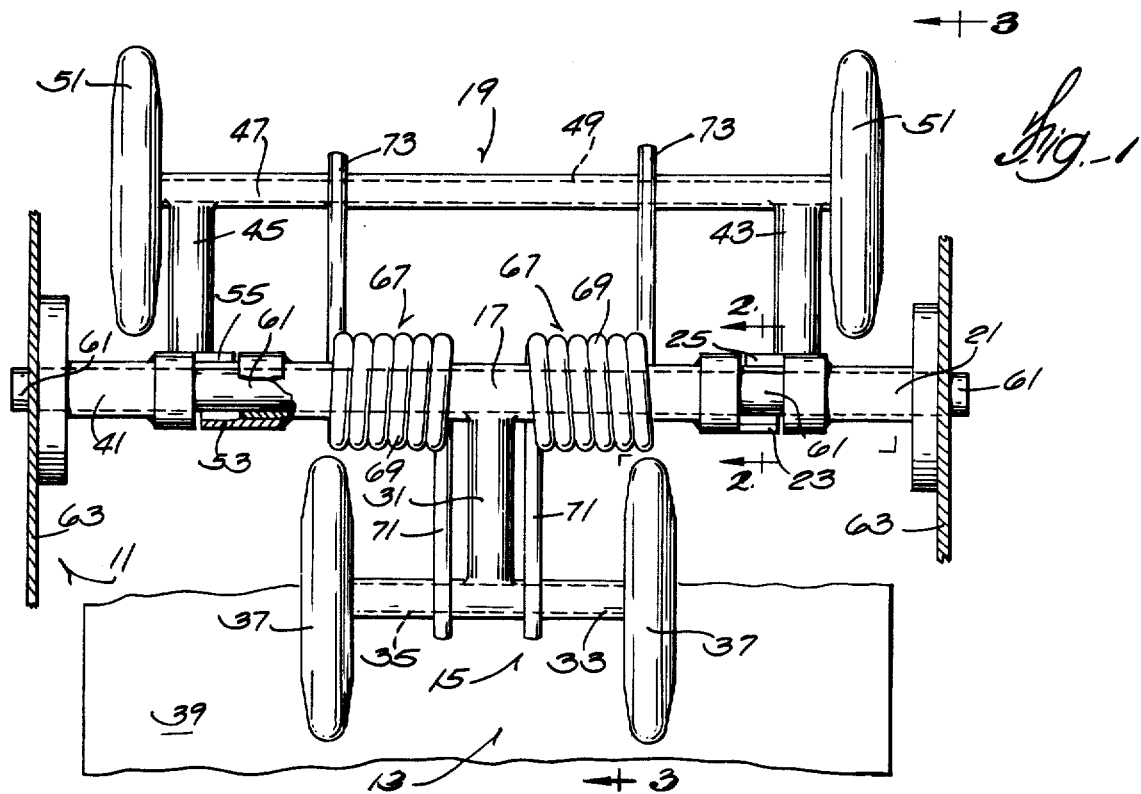
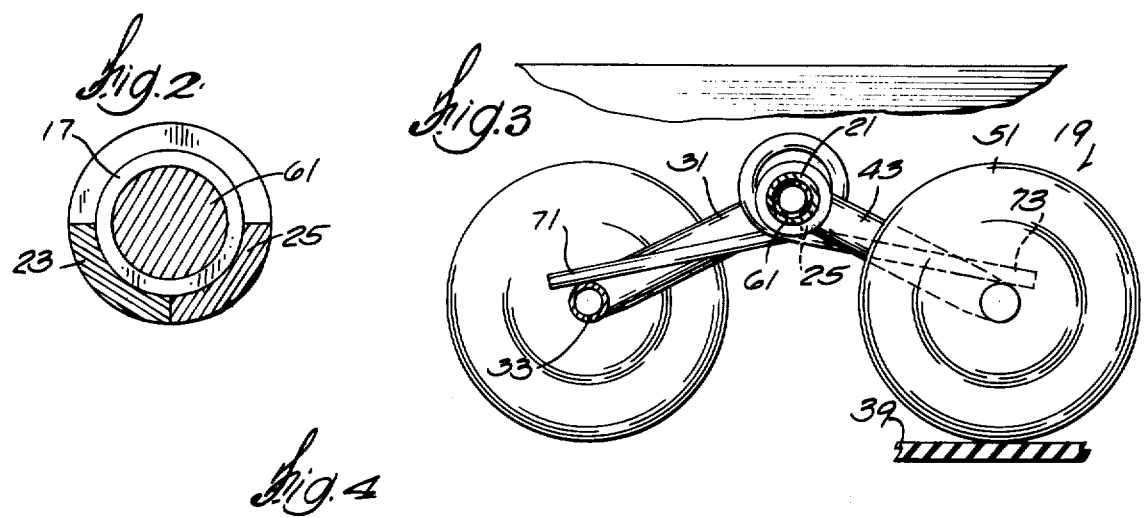
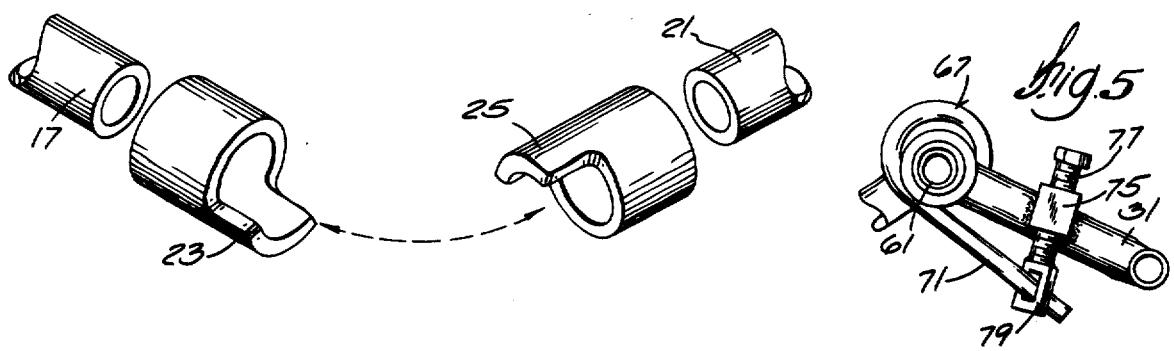

3,922,024

1

BOGIE SUSPENSION SYSTEM

BACKGROUND OF THE INVENTION

The invention relates generally to bogie or bogie wheel suspension systems for vehicles such as snowmobiles. Attention is directed to the following prior United States patents:

| United States Patents | | |
|---|---|---|
| Bombardier | 3,023,824 | issued March 6, 1972 |
| Marier | 3,309,150 | issued March 14, 1967 |
| Lamb | 3,463,561 | issued August 26, 1969 |
| Lamb | 3,510,174 | issued May 5, 1970 |

SUMMARY OF THE INVENTION

The invention provides a bogie wheel suspension for a track vehicle such as a snowmobile, which suspension limits pivotal movement of two bogie wheel supporting trucks toward each other by axially extending stop means on truck supporting sleeves, together with spring means which bias the trucks toward each other to engage the stop members and to preload the stop members with a predetermined force preventing movement of the trucks away from each other in the absence of an opposite force greater than the force applied by the biasing means.

More specifically, the invention provides a truck suspension comprising a frame, a first bogie wheel supporting truck including a first sleeve, a second bogie wheel supporting truck including a second sleeve, means pivotally mounting the first and second trucks on the frame for rotation about a common axis, first and second stop members respectively extending axially and oppositely from the first and second sleeves and engagable with each other to prevent pivotal movement of the trucks toward each other beyond a predetermined angle, and means biasing the first and second trucks for pivotal movement toward each other and for engaging the stop members with a predetermined force.

Still more specifically in accordance with the invention, the second truck includes a third sleeve in spaced co-axial relation to the first sleeve and the sleeves are pivotally mounting on a transverse pivot shaft which is supported by the frame and which extends through the sleeves with the first sleeve being located between the second and third sleeves.

In addition, the first truck includes a bogie wheel supporting arm extending radially from the first sleeve from inwardly of the ends thereof, and the second truck includes transversely aligned second and third arms which respectively extend radially from the second and third sleeves, which are rigidly interconnected at their outer ends, which support a pair of bogie wheels, and which are each substantially transversely spaced from the arm of the first truck.

Still further in accordance with the invention, the first and second stop members are located at the adjacent ends of the first and second sleeves, and third and fourth stop members are located at the adjacent ends of the first and third sleeves. Each pair of stop members extends in adjacent parallel relation to each other axially of the transverse pivot shaft in opposite directions from the supporting sleeves, and have an arcuate extent about the pivot shaft so as to prevent pivotal movement

2 of the trucks toward each other beyond a predetermined angle, while permitting pivotal movement of the trucks away from each other through a predetermined range. The stop members also serve to axially locate the first sleeve in spaced relation between each of the second and third sleeves.

One of the principal features of the invention is the provision of a snowmobile truck providing a substantial amount of open area for reducing the possibility of excessive ice and snow accumulation while, at the same time, providing an arrangement for preventing pivotal movement of the trucks toward each other beyond a predetermined position and for preloading the trucks in the position against movement away from the position.

Another of the principal features of the invention is the provision of a truck suspension system which is economical to construct and which will provide reliable service over a long and useful life.

Other features and advantages of the invention will become known by reference to the following drawings, description, and claims.

DRAWINGS

FIG. 1 is a top elevational view of a snowmobile bogie wheel suspension embodying various of the features of the invention.

FIG. 2 is a sectional view taken along line 2—2 of FIG. 1.

FIG. 3 is a sectional view, with parts broken away, taken generally along line 3—3 of FIG. 1.

FIG. 4 is an exploded perspective view of one pair of stop members embodied in the bogie wheel suspension shown in FIG. 1.

FIG. 5 is a fragmentary view showing a modification.

Before explaining the invention in detail, it is to be understood that the invention is not limited in its application to the details of the construction and arrangement of parts set forth in the the following general description or illustrated in the accompanying drawings, since the invention is capable of other embodiments and of being practiced or carried out in various ways. Also, it is to be understood that the phraseology or terminalogy employed herein is for the purpose of description and not of limitation.

GENERAL DESCRIPTION

Shown in the drawings is a snowmobile frame 11 supporting a bogie wheel suspension 13 embodying various of the features of the invention. More particularly, there is provided a first bogie wheel supporting truck 15 including a first sleeve or tubular member 17, a second bogie wheel supporting truck 19 including a second sleeve or tubular member 21, means pivotally mounting the first and second trucks 15 and 19 on the frame 11 for rotation about a common axis, first and second stop means or stop members 23 and 25 respectively extending axially and oppositely from the first and second sleeves 17 and 21 and engagable with each other to prevent pivotal movement of the trucks 15 and 19 toward each other beyond a predetermined angle, and means biasing the first and second trucks for pivotal movement toward each other and for engaging the stop members 23 and 25 with a predetermined force.

Still more particularly, the first truck 15 also includes an arm 31 which extends radially from the first sleeve 17 intermediate the ends thereof, and which, at its radially outer end, is fixed to a transversely extending axle housing 33 which rotatably carries an axle 35 which, in turn, supports at its ends, a pair of transversely spaced bogie wheels 37 engaging a snowmobile drive track 39.

The second truck 19 includes, in addition to the second sleeve 21, a third sleeve or tubular member 41 which is co-axially spaced from the second sleeve 21. Extending radially from each of the sleeves 21 and 41 are respective arms 43 and 45, which are transversely aligned with each other and which are rigidly interconnected with each other, at their outer ends, by a transversely extending axle housing 47 which rotatably carries an axle 49 supporting, at its ends, a pair of transversely spaced bogie wheels 51 in engagement with the drive track 39.

The suspension 13 further includes third and fourth stop members 53 and 55 respectively extending axially and oppositely from the first and third sleeves 17 and 41 engagable with each other for preventing pivotal movement of the trucks 15 and 19 toward each other beyond the predetermined angle.

Various means can be employed for pivotally mounting the trucks 15 and 19. In the illustrated construction, such means comprises a transverse pivot shaft 61 which extends between spaced frame portions 63 and which is received within the tubular sleeves 17, 21 and 41 such that the first sleeve of the first truck 15 is located between the second and third sleeves 21 and 41 of the second truck 19.

The stop means or members 23 and 25 are respectively located in parallel relation to each other at the adjacent ends of the first and second sleeves 17 and 21 with each of the stop members 23 and 25 extending axially toward each other and arcuately around the axis of the pivot shaft 61 for about 90°, whereby to prevent pivotal movement of the trucks 15 and 19 toward each other beyond the predetermined angle, while permitting pivotal truck movement in the opposite direction through a limited range.

The stop members 53 and 55 are respectively located in parallel relation to each other at the adjacent ends of the first and third sleeves 17 and 41, with each of the stop members 53 and 55 extending axially toward each other and arcuately around the axis of the pivot shaft 61 for about 90 degrees so as to act in a similar manner to the stop members 23 and 25.

The stop members 23 and 25 and 53 and 55 also serve to axially space the first sleeve 17 from both the second and third sleeves 21 and 41 by reason of engagement of the axially outer ends of the stop members with the adjacent ends of the adjacent sleeves.

From the foregoing, it will be noted that the first arm 31 is substantially transversely spaced from the second and third arms 43 and 45 and that the stop members 23, 25, 53, and 55 are located in closely adjacent relation to the pivot shaft 61. As a consequence, the truck suspension is relatively "open" to assist in preventing unwanted and excessive accumulation of ice and snow.

Various means can be provided for biasing the first and second trucks 15 and 19 toward each other and for preloading the stop member 23-25 and 53-55 in engaged relation. In the illustrated construction, helical tension springs 67 are employed, each spring 67 including a central coil portion or part 69 telescopically located around the first sleeve 17 and having oppositely extending end portions 71 and 73. The end portions 73 engage the axle housing 47 of the second truck 19, while the end portions 71 engage the axle housing 33 of the first truck 15. If desired, the end portions 71 could engage stops (not shown) on the arm 31 extending from the first sleeve 17. Furthermore, only one such spring 67 could be employed, or other spring arrangements could be employed.

Preferably, the springs 67 are designed so as to engage the stop members 23-25 and 53-55 with a predetermined loading which resists upward pivotal movement of the trucks 15 and 19 away from each other and which thereby serves to retain the track 39 in the maximum spaced relation from the pivot shaft 61 permitted by the stop members 23-25 and 53-55. If desired, means can be provided for varying or adjusting the degree or amount of loading by the biasing means on the trucks 15 and 19. For instance, adjustable stops could be provided on the first arm 31 in engagement with the spring end portions 71 so as to vary the amount of force exerted by the springs 67 on the trucks 15 and 19 when the stop members 23-25 and 53-55 are in engagement with each other. In the construction illustrated in FIG. 5, such adjustable means comprises threaded sleeves or tubes 75 fixed to the arm 31 and threaded shafts 77 respectively extending in the threaded sleeves or tubes 75 and having, at one end thereof, respective apertured portions 79 through which respectively extend the end portions 71 of the springs 67.

Various of the features of the invention are set forth in the following claims.

What is claimed is:

1. A truck suspension comprising a frame, a first bogie wheel supporting truck including a first sleeve, a second bogie wheel supporting truck including co-axial second and third sleeves extending in spaced relation to each other at a distance at least as great as the axial length of said first sleeve, means pivotally mounting said first and second trucks on said frame for rotation of said first, second and third sleeves about a common axis and with said first sleeve located between said second and third sleeves, first and second stop members respectively extending axially from the axially adjacent ends of said first and second sleeves and engageable with each other for preventing pivotal movement of said trucks toward each other beyond a predetermined angle, third and fourth stop members respectively extending axially from the axially adjacent ends of said first and third sleeves and engageable with each other for preventing pivotal movement of said trucks toward each other beyond the predetermined angle, and means biasing said first and second trucks for pivotal movement toward each other and for engaging said stop members with a predetermined force.

2. A truck suspension in accordance with claim 1 wherein said means pivotally mounting said sleeves comprises a transverse shaft supported by said frame and extending through said first, second and third sleeves.

3. A truck suspension in accordance with claim 1 wherein said first and second sleeves have respective ends in axially adjacent relation to each other with said first and second stop members respectively extending from said axially adjacent ends of said first and second sleeves, and wherein said first and third sleeves hav respective ends in axially adjacent relation to each other with said third and fourth stop members respectively extending from said axially adjacent ends of said first and third sleeves.

4. A truck suspension in accordance with claim 1 wherein said means pivotally mounting said sleeves comprises a transverse shaft supported by said frame and extending through said first, second and third sleeves, wherein said first truck also includes a first arm extending radially from said first sleeve centrally between said first and third stop members and rotatably supporting a pair of axially spaced bogie wheels, wherein said second truck also includes second and third arms respectively extending radially from said second and third sleeves in alignment with each other, means rigidly interconnecting said second and third arms, and a pair of axially spaced bogie wheels rotatably mounted with respect to said second and third arms.

5. A truck suspension system in accordance with claim 4 wherein said stop members axially space said first sleeve from said second and third sleeves.

6. A truck suspension system in accordance with claim 4 wherein said first arm is substantially axially spaced from each of said second and third arms.

7. A truck suspension system in accordance with claim 1 wherein said biasing means comprises a helical spring having a central coiled portion and extending end portions and wherein said coiled portion is telescopically located around said first sleeve and said end portions respectively engage said first and second trucks.

8. A truck suspension comprising a frame, a first bogie wheel supporting truck including a first sleeve, a second bogie wheel supporting truck including a second sleeve, means pivotally mounting said first and second trucks on said frame for rotary movement of said sleeves about a common axis relative to said frame and to each other, first and second stop members respectively extending axially from said first and second sleeves and engageable with each other for preventing pivotal movement of said trucks toward each other beyond a predetermined angle, means biasing said first and second trucks for pivotal movement toward each other and means for varying the bias exerted by said biasing means on said trucks.

9. A truck suspension system comprising a frame, a first bogie wheel supporting truck including a first sleeve, a second bogie wheel supporting truck including a second sleeve, means pivotally mounting said first and second trucks on said frame for rotation about a common axis, first and second stop members respectively extending axially from said first and second sleeves and engageable with each other for preventing pivotal movement of said trucks toward each other beyond a predetermined angle, said stop members each extending arcuately for about 90 degrees, whereby to prevent movement of said trucks toward each other beyond the predetermined angle while permitting movement of said trucks in the other direction through a predetermined range, and means biasing said first and second trucks for pivotal movement toward each other.

* * * * *